United States Patent
Bartfai-Walcott et al.

(10) Patent No.: US 9,195,509 B2
(45) Date of Patent: Nov. 24, 2015

(54) IDENTIFYING OPTIMAL PLATFORMS FOR WORKLOAD PLACEMENT IN A NETWORKED COMPUTING ENVIRONMENT

(75) Inventors: Katalin K. Bartfai-Walcott, El Dorado Hills, CA (US); Gregory J. Boss, Saginaw, MI (US); Christopher J. Dawson, Arlington, VA (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 12/984,646

(22) Filed: Jan. 5, 2011

(65) Prior Publication Data

US 2012/0173708 A1 Jul. 5, 2012

(51) Int. Cl.
*G06F 15/173* (2006.01)
*G06F 9/50* (2006.01)

(52) U.S. Cl.
CPC ............ *G06F 9/5072* (2013.01); *G06F 9/5088* (2013.01); *G06F 2209/501* (2013.01); *G06F 2209/508* (2013.01); *Y02B 60/142* (2013.01); *Y02B 60/162* (2013.01); *Y02B 60/167* (2013.01)

(58) Field of Classification Search
CPC ... G06F 9/5083; G06F 9/5088; G06F 9/5094; G06F 9/5044; G06F 9/5055; G06F 9/50; G06F 9/505; G06F 11/3006; G06F 11/3433; G06F 67/1029; G06F 17/30194; G06F 17/30575; G06F 17/30545; G06F 2009/4557
See application file for complete search history.

(56) References Cited

U.S. PATENT DOCUMENTS

| | | | |
|---|---|---|---|
| 6,880,002 B2 | 4/2005 | Hirschfeld et al. |
| 7,092,985 B2 | 8/2006 | Hubbard |
| 7,363,370 B2 | 4/2008 | Collazo |
| 7,574,496 B2 | 8/2009 | McCrory et al. |
| 7,730,205 B2 | 6/2010 | Rothman et al. |
| 2003/0051021 A1 | 3/2003 | Hirschfeld et al. |
| 2008/0184225 A1 | 7/2008 | Fitzgerald et al. |
| 2009/0157998 A1 | 6/2009 | Batterywala |
| 2009/0300149 A1 | 12/2009 | Ferris et al. |
| 2009/0300210 A1 | 12/2009 | Ferris |

(Continued)

OTHER PUBLICATIONS

"Definition of throughput", http://dictionary.reference.com/browse/throughput.*
Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.

(Continued)

*Primary Examiner* — Andrew Nalven
*Assistant Examiner* — Quy Pham
(74) *Attorney, Agent, or Firm* — William E. Schiesser; Keohane & D'Alessandro PLLC; Maxine L. Barasch (57) ABSTRACT

Embodiments of the present invention provide a workload optimization approach that measures workload performance across combinations of hardware (platform, network configuration, storage configuration, etc.) and operating systems, and which provides a workload placement on the platforms where jobs perform most efficiently. This type of placement may be based on performance measurements (e.g., throughput, response, and other such service levels), but it can also be based on other factors such as power consumption or reliability. In a typical embodiment, ideal platforms are identified for handling workloads based on performance measurements and any applicable service level agreement (SLA) terms.

11 Claims, 5 Drawing Sheets

(56) References Cited

U.S. PATENT DOCUMENTS

| | | |
|---|---|---|
| 2009/0313633 A1 | 12/2009 | Nardelli et al. |
| 2010/0050172 A1 | 2/2010 | Ferris |
| 2010/0131948 A1 | 5/2010 | Ferris |
| 2010/0223217 A1* | 9/2010 | Little ............................ 706/19 |
| 2011/0302286 A1* | 12/2011 | Parolini et al. ............... 709/223 |
| 2012/0089726 A1* | 4/2012 | Doddavula .................... 709/224 |
| 2013/0297800 A1* | 11/2013 | Considine et al. ............ 709/226 |

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

* cited by examiner

IDENTIFYING OPTIMAL PLATFORMS FOR WORKLOAD PLACEMENT IN A NETWORKED COMPUTING ENVIRONMENT

TECHNICAL FIELD

The present invention relates to workload placement. Specifically, the present invention relates to optimizing the placement of a workload (e.g., among platforms) in a networked computing environment (e.g., a cloud computing environment).

BACKGROUND

The cloud computing environment is an enhancement to the predecessor grid environment, whereby multiple grids and other computation resources may be further abstracted by a cloud layer, thus making disparate devices appear to an end-consumer as a single pool of seamless resources. These resources may include such things as physical or logical compute engines, servers and devices, device memory, and storage devices.

Corporate and/or enterprise systems customers often make server purchase decisions based on the number of processors, size and speed versus cost, effective implementation, and/or usage parameters. In evaluating new server solutions, customers frequently consider processor numbers and speed as the key decision factors for accomplishing workload. Currently, operating system or application-based utilization tools are used to measure system and processor utilization. Output provided by these toos may then be graphed, statistically analyzed, reported, and correlated back to the original purchase criteria. However, in many complex environments, such as those surrounding networked (e.g., cloud) computing installations, these measurements may be insufficient, and additional functionality is needed to ascertain whether the server decision is correct for the system implementation and application load running on the server infrastructure.

SUMMARY

Embodiments of the present invention provide a workload optimization approach that measures workload performance across combinations of hardware (platform, network configuration, storage configuration, etc.) and operating systems, and which provides a workload placement on the platforms where jobs perform most efficiently. This type of placement may be based on performance measurements (e.g., throughput, response, and other such service levels), but it can also be based on other factors such as power consumption or reliability. In a typical embodiment, optimal platforms are identified for handling workloads based on performance measurements and any applicable service level agreement (SLA) terms.

A first aspect of the present invention provides a method for optimizing workload placement in a networked computing environment, comprising: monitoring a workload; measuring a performance of the workload on a current platform using a set of performance metrics; identifying an optimal platform for handling the workload based on the performance and a set of service level agreement (SLA) terms; and migrating the workload from the current platform to the optimal platform.

A second aspect of the present invention provides a system for optimizing workload placement in a networked computing environment, comprising: a bus; a processor coupled to the bus; and a memory medium coupled to the bus, the memory medium comprising instructions to: monitor a workload; measure a performance of the workload on a current platform using a set of performance metrics; identify an optimal platform for handling the workload based on the performance and a set of service level agreement (SLA) terms; and migrate the workload from the current platform to the optimal platform.

A third aspect of the present invention provides a computer program product for optimizing workload placement in a networked computing environment, the computer program product comprising a computer readable storage media, and program instructions stored on the computer readable storage media, to: monitor a workload; measure a performance of the workload on a current platform using a set of performance metrics; identify an optimal platform for handling the workload based on the performance and a set of service level agreement (SLA) terms; and migrate the workload from the current platform to the optimal platform.

A fourth aspect of the present invention provides a method for deploying a system for optimizing workload placement in a networked computing environment, comprising: providing a computer infrastructure being operable to: monitor a workload; measure a performance of the workload on a current platform using a set of performance metrics; identify an optimal platform for handling the workload based on the performance and a set of service level agreement (SLA) terms; and migrate the workload from the current platform to the optimal platform.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide a workload optimization approach that measures workload performance across combinations of hardware (platform, network configuration, storage configuration, etc.) and operating systems, and which provides a workload placement on the platforms where jobs perform most efficiently. This type of placement may be based on performance measurements (e.g., throughput, response, and other such service levels), but it can also be based on other factors such as power consumption or reliability. In a typical embodiment, ideal platforms are identified for handling workloads based on performance measurements and any applicable service level agreement (SLA) terms.

It is understood in advance that although this disclosure includes a detailed description of cloud computing, implementation of the teachings recited herein are not limited to a cloud computing environment. Rather, embodiments of the present invention are capable of being implemented in conjunction with any other type of networked computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
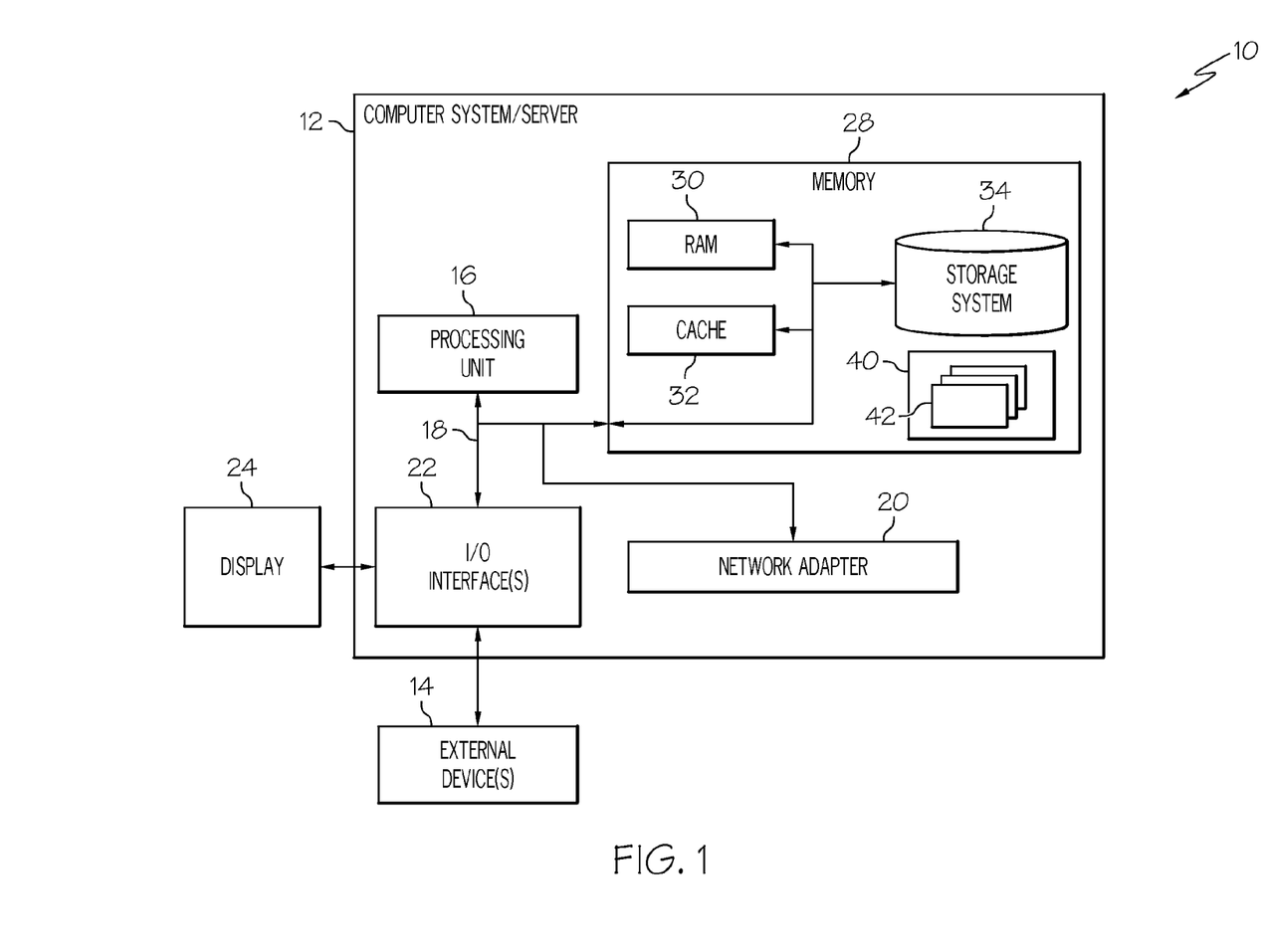
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Workload placement program/utility/engine 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
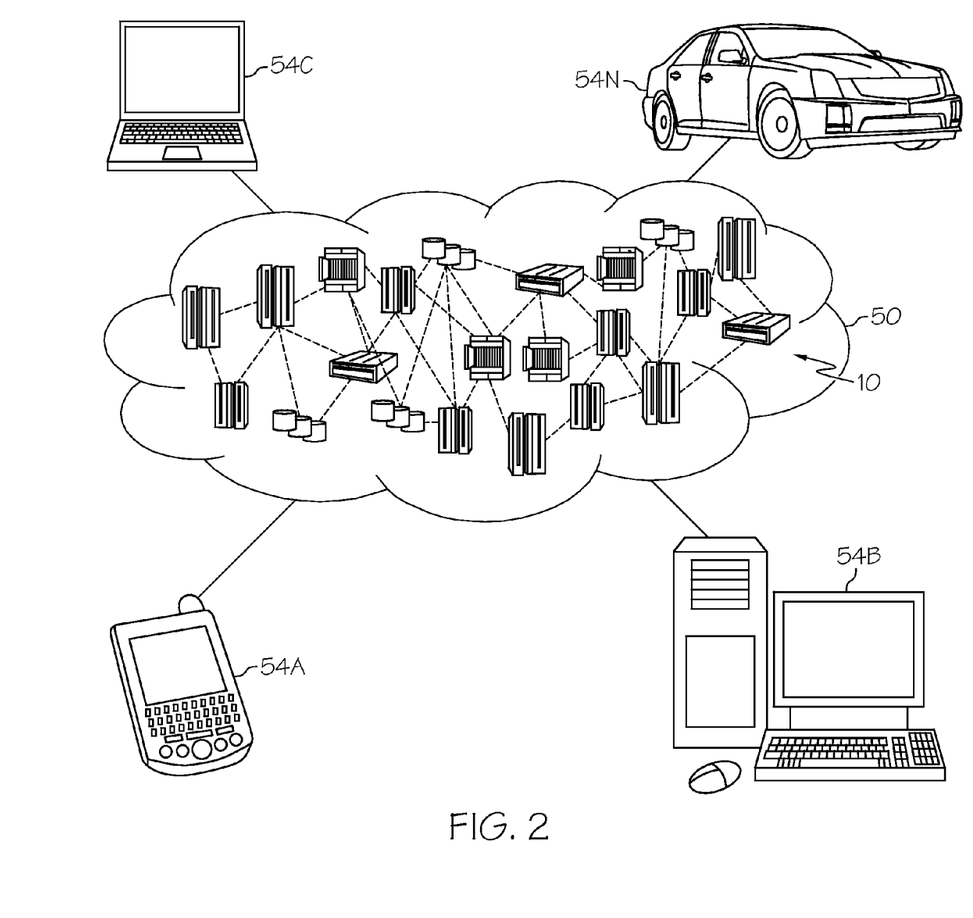
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
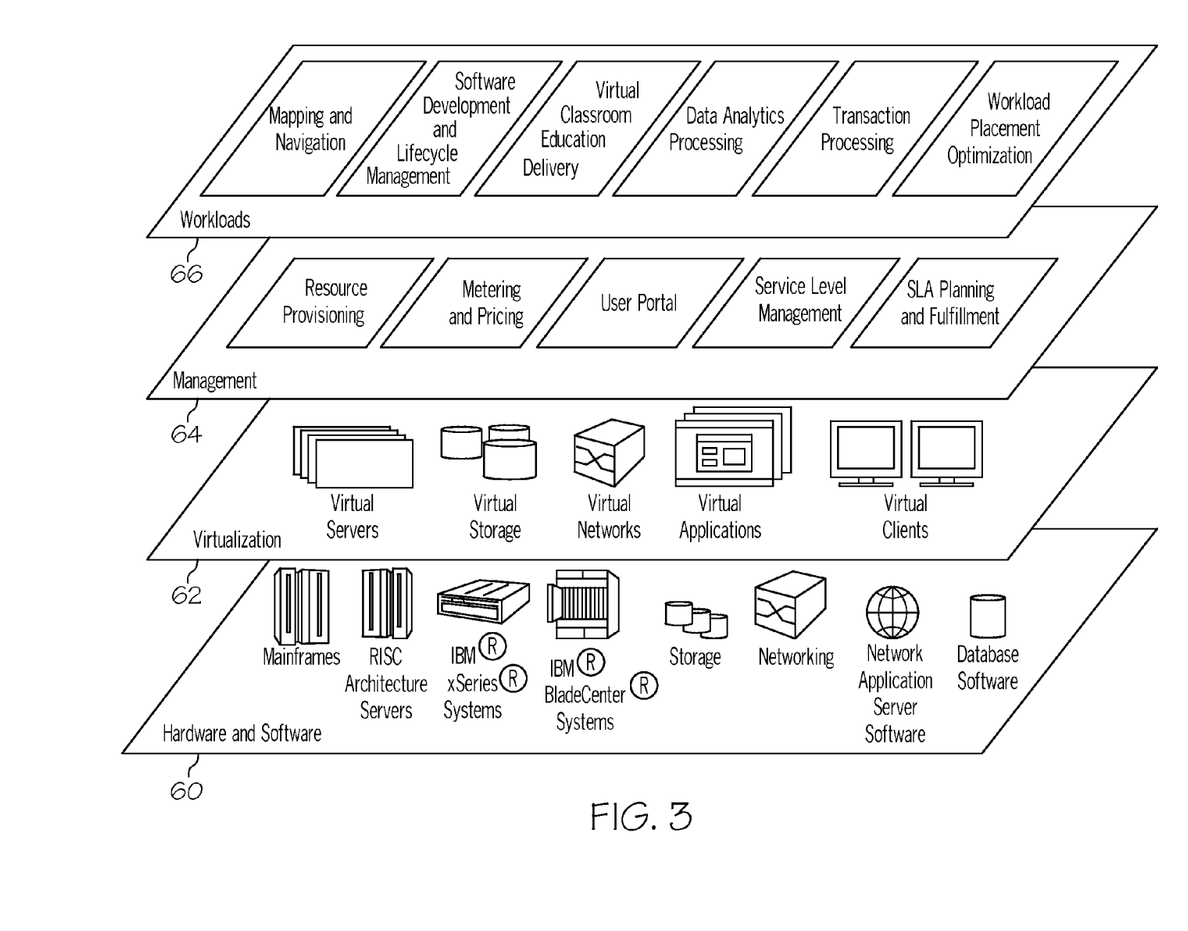
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload placement optimization. As mentioned above, all of the foregoing examples described with respect to FIG. 3 are illustrative only, and the invention is not limited to these examples.

It is understood all functions of the present invention as described herein typically may be performed by the workload placement optimization function/engine, which can be tangibly embodied as modules of program code 42 of workload placement program/utility/engine 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

However, in order to first provide a contrast with that which is known, existing methods have static value assignments for different hardware characteristics. The static workload results may be seen as follows.

| Workloads | | Workload A = | Workload A = | Workload A = |
|---|---|---|---|---|
| | Response Time | 10 Seconds | 20 Seconds | 30 Seconds |
| | Response Time | Workload B = 20 Seconds | Workload B = 20 Seconds | Workload B = 10 Seconds |
| Platform | Operating System | X | Y | Z |
| | Vendor | A | B | C |
| | Architecture | 2.4 Ghz | 2.4 Ghz | 3.2 Ghz |

In the above table, it may be seen that Workload A has a response time of 10 seconds on Vendor A's platform, even though the platform features an older operating system and slower CPU speed than does Vendor C's. Conversely Workload B performs worse on that same platform (Vendor A's). Other workload placement algorithms typically use benchmarks to determine job placement. Such algorithms assume that the highest benchmarks represent the fastest platforms generically, when in fact, certain workloads will have characteristics causing them to excel on different platforms (e.g., CPU architectures, hyper-threading, superscalar pipelines, memory bandwidth, etc.).

Under embodiments of the present invention, an approach is provided that determines which workloads should be placed in specific software and/or hardware combinations. Furthermore, this approach then optimizes workload placement in a networked computing environment, such as a cloud computing environment, based on such values. To optimize performance beyond those standards known today, job placement logic must discern which workloads perform best on multiple platforms. To accomplish this, an additional workload management function may be added to the environment. This workload manager may take action after the environment has already provisioned one or more assets. The workload manager then discovers the type of workload deployed among virtual machine(s), registers that workload, and begins to measure its effective performance.

After the effective performance of various workloads is measured, the workload manager evaluates current active workloads with previously collected performance metrics, and communicates placement recommendations to the cloud manager. It should be noted that the workload manager may be contained within the same, or a differing, entity as the cloud manager. Nevertheless, if a workload type is known, and a new provisioning request is being fulfilled by the cloud, then the workload manager may make a determination pertaining to where to initially place the workload. If the workload already exists and has previously been identified, the workload manager may periodically evaluate placement decisions that would improve performance and communicate back to the cloud manager a preferred migration of the workload to a new platform.

Figure 4:
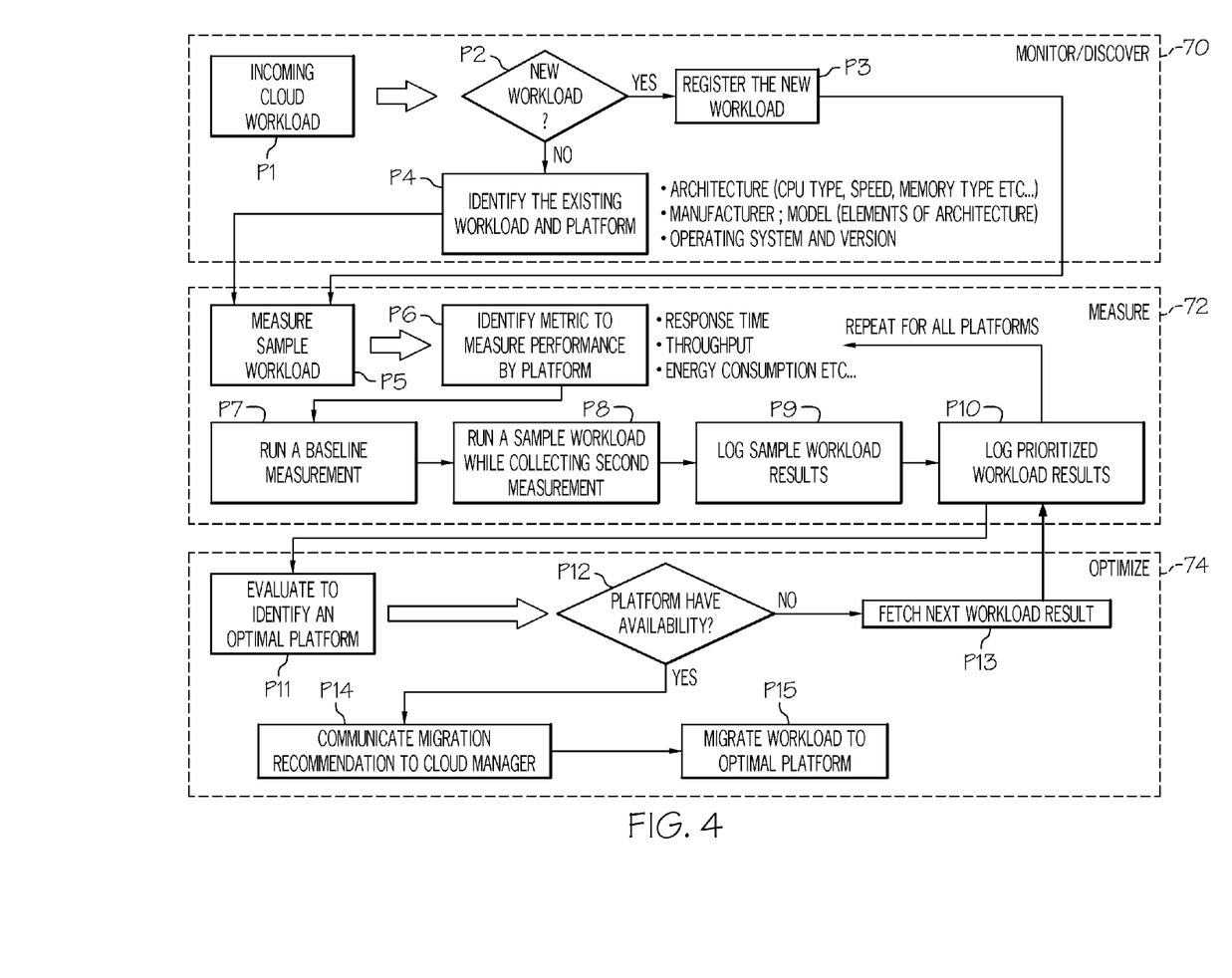
FIG. 4 depicts a process flow diagram according to an embodiment of the present invention.

Referring to FIG. 4, a process flow diagram according to embodiments of the present invention is shown. Steps to implement workload placement using the Workload Manager may include those similar to the following:

A. Monitor/Discover 70

1. In step P1, new workloads are monitored/discovered (e.g., either in an automated or manual fashion). This could be aggregated coarsely (e.g., via Java, Objective C, a batch process, a grid arrangement, etc) or in highly granular fashion (e.g., via a Java API, a retail bank loan application, etc.).

2. In step P2, it is determined whether the workload is new.
3. If so, the new workload is registered in step P3.
4. If not, the existing workload and platform are identified in step P4. Among the hardware/software attributes that can be identified are the following:
    a. architecture (CPU type, speed, memory type, bandwidth, storage type, etc.);
    b. manufacturer and model (model will identify some elements of the architecture); and
    c. operating system and version.

B. Measure workload performance 72
1. In step P5, a sample workload is identified/measured. This could be submitted by the owner of a particular resource, or selected independently (e.g., at random).
2. In step P6, a set of performance metrics are selected to measure performance of the sample workload. Such performance metrics could include response time, throughput, energy consumed, etc.
3. In step P7, a baseline measurement is taken/run using a set of the performance metrics.
4. In step P8, a sample workload is run (e.g., while collecting a second measurement).
5. In steps P9 and P10, results can be logged. Specifically, the sample workload results are logged, while in step P10, prioritized workload results can be logged. As further depicted, the measurement process 72 can be repeated for all platforms.

C. Optimize the workload 74
1. In step P11, all platforms where the workload has been measured will be identified, and the identity of an optimal platform for handling the workload will be determined. The identification of an optimal platform is typically based on the above performance metrics and any applicable SLA terms (e.g., the optimal platform must be able to accommodate the workload without violating any SLA terms).
2. In step P12, it is determined whether the optimal platform has availability to handle the workload. If a "scarce" resource is needed, then the effect of swapping active resources can be evaluated.
3. If in step P12 it is determined that the optimal platform does not have sufficient availability to handle the workload, then a next workload can be fetched in step P13, and the results logged.
4. If, however, the optimal platform can handle the workload, such a recommendation can be communicated to a network manager or the like in step P14.
5. Thereafter, the workload can be migrated from its existing platform to the optimal platform in step P15.

Illustrative Embodiments/Examples

Apparatus to measure workload affinities:

Such an apparatus could be constructed, for example, as a low power consumption device with a solid state memory card, a CPU and embedded Linux operating system running the system management, data collection, and retention services/logic. Alternatively, it could be provided as a logical software product, utilizing cycles on a computer server within the stated environment. Typically, but not required, the system might include tables with mean, average, and best in class usage for all system components. Furthermore, it could have access to various system sensors, including service processor(s), and the operating system and networking resources through simple network management protocol (SNMP) queries. The data provided could conceivably include correlation between best-in-class versus actual usage for all components, which then can be statistically and cost-performance evaluated.

In one implementation, a "black box" device, running independently of existing server components, could be installed in servers to measure and record system implementation, configuration, and usage information. This data could then be used to evaluate the usage and server implementation and allow the enterprise to make proactive, system-wide configuration, implementation, and server recommendations for customers to meet specific business needs. One advantage of such a system is that it is not interfering with or impacting the normal operations of the server while collecting valuable information that the customer can use for problem determination and/or return on investment evaluation. Furthermore, it could be proactively utilized to make server/architecture recommendations for customers' specific requirements and implementations.

Figure 5:
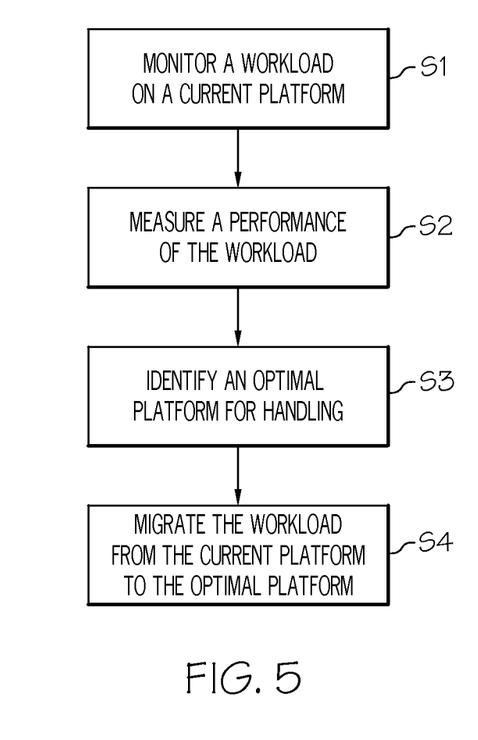
FIG. 5 depicts a method flow diagram according to an embodiment of the present invention.

Referring now to FIG. 5, a method flow diagram according to embodiments of present invention is shown. As depicted, in step S1, a workload is monitored. In this step, it can be determined if the workload is an existing workload or a new workload. If new, the workload can be registered. In step S2, a performance of the workload (or a sample thereof) is measured on a current platform using a set of performance metrics. This step can include one or more of the following operations: identifying a sample of the workload; identifying the set of performance metrics; taking a baseline measurement of the sample; running the sample; and/or logging a set of results of the measuring. In step S3, an optimal platform for handling the workload is identified based on the performance and a set of service level agreement (SLA) terms. This step can include one or more of the following operations: evaluating all platforms where the workload has been measured; and/or determining if the optimal platform has availability to handle the workload. Then, in step S4, the workload is migrated from the current platform to the optimal platform.

While shown and described herein as a workload placement optimization solution, it is understood that the invention further provides various alternative embodiments. For example, in one embodiment, the invention provides a computer-readable/useable medium that includes computer program code to enable a computer infrastructure to provide workload placement optimization functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide workload placement optimization functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/ or the service provider can receive payment from the sale of advertising content to one or more third parties.

In still another embodiment, the invention provides a computer-implemented method for workload placement optimization. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for optimizing workload placement in a networked cloud computing environment, comprising:
   defining the networked cloud computing environment as comprising a plurality of independent cloud networks;
   monitoring a workload;
   determining, based on the monitoring, whether the workload is new or previously-exists;
   if the workload is new, determining where to initially place the workload, and placing the workload onto an initial platform based on the determination, the initial platform comprising a first hardware and software combination;
   if the workload previously-exists, locating the workload on a current platform for further evaluation, the current platform and the initial platform comprising the same platform;
   taking a measurement of a performance of the workload on a combination of software and hardware of a current platform of an independent cloud network using a set of performance metrics, the set of performance metrics comprising at least one of throughput and energy consumption;
   identifying an optimal platform for handling the workload based on a set of service level agreement (SLA) terms and a comparison of the measurement of the performance of the workload on the combination of software and hardware of the current platform to measurements of a performance of the workload on a combination of software and hardware of each of all of a plurality of platforms of independent cloud networks where the workload has been measured;
   determining whether the optimal platform has availability to handle the workload;
   evaluating if a scarce resource is needed;
   if a scarce resource is needed, evaluating an effect of swapping the workload with active resources on the optimal platform;
   if the swapping is not effective, fetching a next workload;
   if it is determined that the optimal platform has the availability, recommending to migrate the workload to the optimal platform; and
   migrating the workload from the current platform to the optimal platform if it is recommended.

2. The method of claim 1, further comprising:
   determining if the workload is a new workload or an existing workload; and
   registering the workload if the workload is determined to be a new workload.

3. The method of claim 1, the measuring comprising:
   receiving a sample of the workload from an owner of a particular resource;
   identifying, based on the receiving, the sample of the workload;
   identifying the set of performance metrics;
   taking a baseline measurement of the sample;
   running the sample; and
   logging a set of results of the measuring.

4. A system for optimizing workload placement in a networked cloud computing environment, comprising:
   a bus;
   a processor coupled to the bus; and
   a memory medium coupled to the bus, the memory medium comprising instructions to:
      define the networked cloud computing environment as comprising a plurality of independent cloud networks;
      monitor a workload;
      determine, based on the monitoring, whether the workload is new or previously-exists;
      if the workload is new, determine where to initially place the workload, and placing the workload onto an initial platform based on the determination, the initial platform comprising a first hardware and software combination;

if the workload previously-exists, locate the workload on a current platform for further evaluation, the current platform and the initial platform comprising the same platform;

take a measurement of a performance of the workload on a combination of software and hardware of a current platform of an independent cloud network using a set of performance metrics, the set of performance metrics comprising at least one of throughput and energy consumption;

identify an optimal platform for handling the workload based on a set of service level agreement (SLA) terms and a comparison of the measurement of the performance of the workload on the combination of software and hardware of the current platform to measurements of a performance of the workload on a combination of software and hardware of each of all of a plurality of platforms of independent cloud networks where the workload has been measured;

determining whether the optimal platform has availability to handle the workload;

evaluate if a scarce resource is needed;

if a scarce resource is needed, evaluate an effect of swapping the workload with active resources on the optimal platform;

if the swapping is not effective, fetch a next workload;

if it is determined that the optimal platform has the availability, recommend to migrate the workload to the optimal platform; and migrate the workload from the current platform to the optimal platform if it is recommended.

5. The system of claim 4, the memory medium further comprising instructions to:

determine if the workload is a new workload or an existing workload; and register the workload if the workload is determined to be a new workload.

6. The system of claim 4, the memory medium further comprising instructions to:

receive a sample of the workload from an owner of a particular resource;

identify, based on the receiving, the sample of the workload;

identify the set of performance metrics;

take a baseline measurement of the sample;

run the sample; and log a set of results of the measuring.

7. A computer program product for optimizing workload placement in a networked cloud computing environment, the computer program product comprising a non-transitory computer readable storage media, and program instructions stored on the non-transitory computer readable storage media, to:

define the networked cloud computing environment as comprising a plurality of independent cloud networks;

monitor a workload;

determine, based on the monitoring, whether the workload is new or previously-exists;

if the workload is new, determine where to initially place the workload, and placing the workload onto an initial platform based on the determination, the initial platform comprising a first hardware and software combination;

if the workload previously-exists, locate the workload on a current platform for further evaluation, the current platform and the initial platform comprising the same platform;

take a measurement of a performance of the workload on a combination of software and hardware of a current platform of an independent cloud network using a set of performance metrics, the set of performance metrics comprising at least one of throughput and energy consumption;

identify an optimal platform for handling the workload based on a set of service level agreement (SLA) terms and a comparison of the measurement of the performance of the workload on the combination of software and hardware of the current platform to measurements of a performance of the workload on a combination of software and hardware of each of all of a plurality of platforms of independent cloud networks where the workload has been measured;

determine whether the optimal platform has availability to handle the workload;

evaluate if a scarce resource is needed;

if a scarce resource is needed, evaluate an effect of swapping the workload with active resources on the optimal platform;

if the swapping is not effective, fetch a next workload;

if it is determined that the optimal platform has the availability, recommend to migrate the workload to the optimal platform; and migrate the workload from the current platform to the optimal platform if it is recommended.

8. The computer program product of claim 7, further comprising program instructions stored on the non-transitory computer readable storage media to:

determine if the workload is a new workload or an existing workload; and register the workload if the workload is determined to be a new workload.

9. The computer program product of claim 7, further comprising program instructions stored on the non-transitory computer readable storage media to:

randomly select a sample of the workload;

identify a sample of the workload based on the random selection;

identify the set of performance metrics;

take a baseline measurement of the sample;

run the sample; and log a set of results of the measuring.

10. A method for deploying a system for optimizing workload placement in a networked cloud computing environment, comprising:

providing a computer infrastructure being operable to:

define the networked cloud computing environment as comprising a plurality of independent cloud networks;

monitor a workload;

determine, based on the monitoring, whether the workload is new or previously-exists;

if the workload is new, determine where to initially place the workload, and placing the workload onto an initial platform based on the determination, the initial platform comprising a first hardware and software combination;

if the workload previously-exists, locate the workload on a current platform for further evaluation, the current platform and the initial platform comprising the same platform;

take a measurement of a performance of the workload on a combination of software and hardware of a current platform of an independent cloud network using a set of performance metrics, the set of performance metrics comprising at least one of throughput and energy consumption;

identify an optimal platform for handling the workload based on a set of service level agreement (SLA) terms and a comparison of the measurement of the performance of the workload on the combination of software and hardware of the current platform to measurements of a performance of the workload on a combination of software and hardware of each of all of a plurality of platforms of independent cloud networks where the workload has been measured;

determine whether the optimal platform has availability to handle the workload;

evaluate if a scarce resource is needed;

if a scarce resource is needed, evaluate an effect of swapping the workload with active resources on the optimal platform;

if the swapping is not effective, fetch a next workload;

if it is determined that the optimal platform has the availability, recommend to migrate the workload to the optimal platform; and migrate the workload from the current platform to the optimal platform if it is recommended.

11. The method of claim 10, the computer infrastructure being further operable to:

determine if the workload is a new workload or an existing workload; and register the workload if the workload is determined to be a new workload.

* * * * *